US009552742B2

(12) United States Patent
McArthur

(10) Patent No.: US 9,552,742 B2
(45) Date of Patent: Jan. 24, 2017

(54) DATA DIAGNOSTIC EVALUATION DEVICE

(76) Inventor: Earl Dwight McArthur, Espanola, NM (US)

( * ) Notice: Subject to any disclaimer, the term of this patent is extended or adjusted under 35 U.S.C. 154(b) by 0 days.

(21) Appl. No.: 13/534,987

(22) Filed: Jun. 27, 2012

(65) Prior Publication Data

US 2013/0171612 A1 Jul. 4, 2013

Related U.S. Application Data

(60) Provisional application No. 61/501,299, filed on Jun. 27, 2011.

(51) Int. Cl.
*G09B 19/00* (2006.01)
*G09B 1/02* (2006.01)
*G09B 1/00* (2006.01)
*G09B 3/00* (2006.01)

(52) U.S. Cl.
CPC ............... *G09B 19/00* (2013.01); *G09B 1/00* (2013.01); *G09B 1/02* (2013.01); *G09B 3/00* (2013.01)

(58) Field of Classification Search
CPC ...................................................... G09B 1/00
USPC .................................. 434/199, 365, 430, 433
See application file for complete search history.

(56) References Cited

U.S. PATENT DOCUMENTS 2,137,447 A * 11/1938 Ellis .............................. 434/353
3,188,754 A * 6/1965 Loving .......................... 434/354
4,021,938 A * 5/1977 Antioco ........................ 434/354
5,518,409 A * 5/1996 White ........................... 434/405

FOREIGN PATENT DOCUMENTS

WO WO 81/03565 A1 * 12/1981 ............... G10G 1/02

OTHER PUBLICATIONS

"Glasstique Planner/ Telephone Stand," http://web.archive.org/web/20081122115441/http://www.officeworld.com/Worlds-Biggest-Selection/DEF41890/08Q3/. Nov. 22, 2008.*
"Table Marker,"http://www.google.com/imgres?imgurl=http://thecueshop.co.uk/wp-content/uploads/2008/09/snkr-rule.jpg&imgrefurl=http://thecueshop.co.uk/?page_id%3D381&h=1179&w=3365&sz=433&tbnid=iXOSV_RXfXeTBM:&tbnh=90&tbnw=257&zoom=1&usg=_UEhr3iZJp1jn_oDUulBzQSwRoy4=&docid=CiqKqH9ibWuTiM&sa=X&ei=ibfiUpeNCcmjsQSl2lGoAQ&ved=0CJ4BEPUBMA0,Mar. 25, 2008.*
"Storage Box 24 Compartment Organizer Tray Compact Small Items See Thru Slide Lid," Paylak, https://www.amazon.com/Storage-Compartment-Organizer-Compact-Small/dp/B001ARZDNQ/ref=sr_1_1?ie=UTF8&qid=1472762646&sr=8-1&keywords=slide+lid+jewelry, Jun. 5, 2008.*

* cited by examiner

*Primary Examiner* — Robert J Utama
*Assistant Examiner* — Jennifer L Korb
(74) *Attorney, Agent, or Firm* — Jeffrey D. Myers; Justin R. Muehlmeyer; Peacock Myers, P.C.

(57) ABSTRACT

A teaching aid to aid in evaluating data may include a frame member and an eye guide movably connected to the frame member to guide the user of the teaching aid in evaluating the data. The frame member may include a top frame wall, a pair of opposing a side frame walls to connect to the top frame wall and a bottom frame wall to connect to the pair of opposing side frame walls, and the frame member may include a divider wall to define a cavity for the data to be evaluated.

7 Claims, 11 Drawing Sheets

DATA DIAGNOSTIC EVALUATION DEVICE

PRIORITY

The present invention claims priority based upon 35 USC section 119 and a provisional application which was filed on Jun. 27, 2011 with a Ser. No. of 61/501,299. This application is incorporated by reference in its entirety.

FIELD OF THE INVENTION

The present invention relates to teaching aids and more particularly to a teaching aid for grading student material. The present invention relates generally to test or data evaluation. The present invention organizes and holds test answers or data to help the human brain diagnostic evaluate the information.

BACKGROUND

It is well-known that teachers spend a great deal amount of time grading papers including home work and tests. This can be a very tedious task. Furthermore, it is difficult to determine when all the homework and tests have been submitted for review. It would be desirable to have a device which would aid the teacher to accomplish the tasks.

SUMMARY

A teaching aid to aid in evaluating data may include a frame member and an eye guide movably connected to the frame member to guide the user of the teaching aid in evaluating the data. The frame member may include a top frame wall, a pair of opposing a side frame walls to connect to the top frame wall and a bottom frame wall to connect to the pair of opposing side frame walls, and the frame member may include a divider wall to define a cavity for the data to be evaluated.

The eye guide may be magnetically connected to the frame member.

The divider wall may be a vertical divider wall.

The divider wall may be a horizontal divider wall.

The teaching aid may include a handle.

The teaching aid may include indicia to indicate the data.

The data may be answers to a test.

The teaching aid may include a downward projection

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

Figure 1:
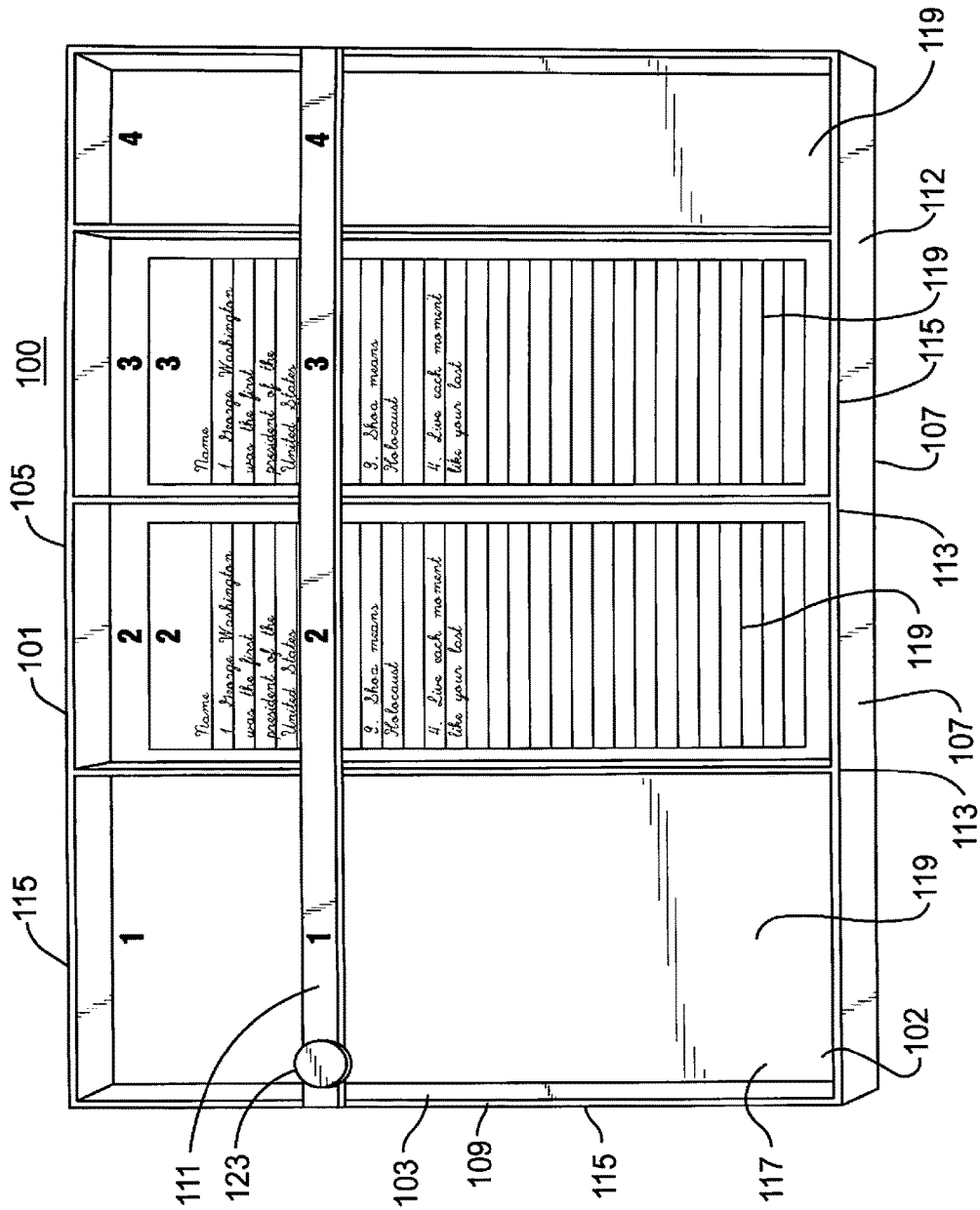
FIG. 1 illustrates a perspective view of the teaching aid of the present invention.

FIG. 1 illustrates a teaching aid 100 of the present invention which may include a frame member 101 which may be rectangular, circular, oval or other appropriate shape. The frame member 101 may include a pair of opposing side frame walls 103 which may be connected to a top frame wall 105 and a bottom frame wall 107, the top frame wall 105 may be connected to the pair of opposing side frame walls 103, and the bottom frame wall 107 may be connected to the pair of opposing side frame walls 103. The walls 103, 105, 107 may be substantially rectangular and may be solid and may be formed from metal, wood or other appropriate material.

In addition, the frame member 101 may include a multitude of divider walls 113 which may extend between the top frame wall 105 and the bottom frame wall 107 and may be substantially parallel to the side frame walls 103. The divider walls 113 may be equally spaced and may be a predetermined distance from adjacent divider walls 113.

The top frame wall 105, the bottom frame wall 107 and the side frame wall 103 may cooperate with the divider walls 113 to form a multitude of cavities 119 which may accept individual student material. The cavities 119 may include indicia 145 to indicate the student and may be substantially the same size. The teaching aid 100 may include or may not include a back wall 102 which may connect the side frame wall 103, the top frame wall 105 and the bottom frame wall 107. The back wall 102 may support the answers submitted by the students.

In addition, a side rail 109 may be positioned over each of the side frame walls 103 and may extend from the top frame wall 105 to the bottom frame wall 107. The side rail 109 may be formed from magnetic material in order to cooperate with a separate magnet 123 or a magnetic portion of an eye guide 111 which may extend substantially perpendicular to the divider walls 113 and the slidable eye guide 111 may move along the side rail 109. A magnet 123 may be positioned over the eye guide 111 and cooperate with the side rail 109 to retain the eye guide 111 in a position to help the teacher evaluate the answers of the student which may be placed in the cavity 119. Thus, the teacher may grade the same question/homework of the students before the eye guide 111 is moved to evaluate the next answer of the student.

Figure 2:
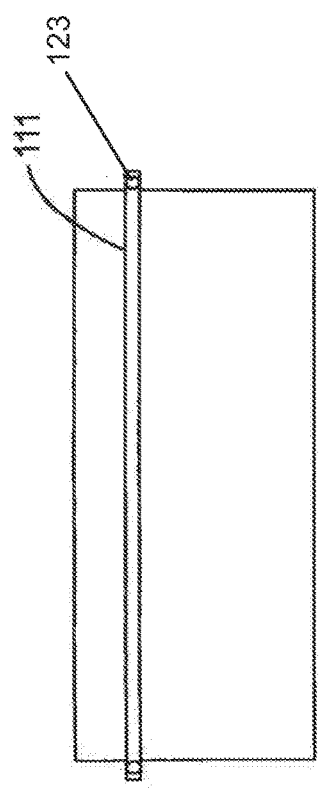
FIG. 2 illustrates the eye guide and the magnets of the present invention.
Figure 3:
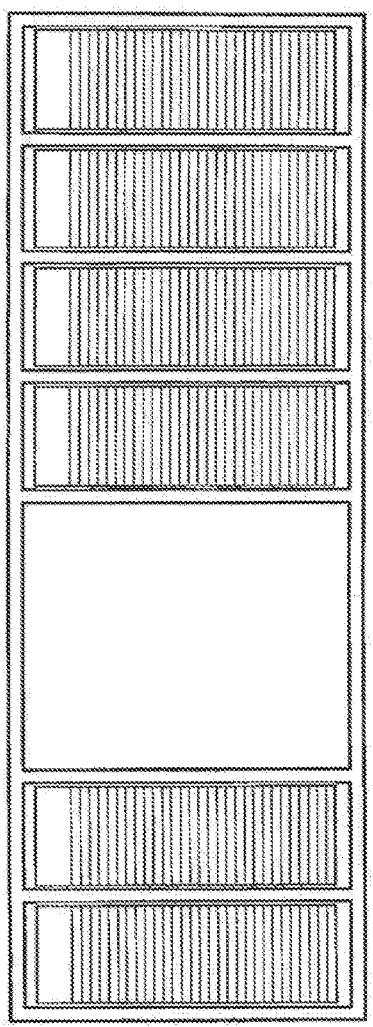
FIG. 3 illustrates the teaching aid of the present invention.

FIG. 2 illustrates the eye guide 111 and the magnet 123 and FIG. 3 illustrates the test answers being aligned in the cavities 119. The cavities 119 allow the test answers to be aligned. The present invention provides a quick and easy way to determine if the students have submitted their paper. The present invention allows papers to be graded in less time and the grading is diagnostic. The teacher can grade the same question of the students at the same time. The present invention allows to reteach the same class. Papers can be returned sooner. Papers may be in the same order as the grade book. The device is diagnostic in the sense that the teacher can tell how many students missed or correctly answered a given question. The present invention may also give diagnostic information about specific items of data. This allows the teacher to teach again or give the information again before the students receiving the information leave for the day. The present invention provides human minds to analyze the answer sheet and data and not computers.

The cavities 119 may have numbers or the student name to place their answer sheet to indicate what data may have been submitted or not.

The present invention motivates listeners to listen better and to learn more.

The present invention provides feedback to motivate the students to listen and learn more.

The present invention provides a device for the teacher to give an oral test at any time, and the oral test can be made up by the instructor during the instruction and may be adjusted to the learning situation.

The present invention allows a specific group of students to be placed on different grading boards/teaching aid 100. This allows for diagnostic evaluation for different groups or different types of data.

The present invention allows grading boards to be connected together.

The present invention allows many types of answer sheets to be used such as true false, bubble sheets, written word, short answer, complete sentence or other appropriate types of answers.

The present invention may allow index cards to be used which may be folded in half or in a quarter and may allow regular line paper to provide low-cost answer sheets.

The present invention provides a device which allows faster recording of information from the students.

In addition to the divider walls 113 which are shown as vertical divider walls 113, the present invention may include horizontal divider walls 142 in order to provide additional cavities 119.

The eye guide 111 positions the answer sheets and retains them in the correct position to be evaluated. The eye guide 111 provides a marker to guide the eyes so that the human teacher can evaluate the data on the answer sheet. The eye guide 111 maybe formed from flexible and stretchable material or may be rigid and may cooperate with magnets 123 to hold it in position.

The eye guide 111 helps guide the human eyes across the same answer allowing the human brain to do the diagnostic evaluation.

The student identification number may be a name or number that may be placed on or near each of the cavity 119.

A hinge 131 may be positioned on the side frame wall 103 to connect a first teaching aid 100 to a second teaching aid 100 and to allow the first teaching aid 100 to fold adjacent to the second teaching aid 100.

The teaching aid 100 may include a handle 141 which may be substantially U-shaped and may be connected to the top frame wall 105 in order for the user of the teaching aid 100 to easily move the teaching aid 100.

The teaching aid 100 maybe formed in various sizes and colors and materials.

In operation, the answer sheet or datasheet may be placed into the cavity 119 in accordance with the indicia 145 corresponding to the data classification or the name of the student. The eye guide 111 may be adjusted along the side rail 109 so that the same answer (data) may be exposed to the teacher so that the teacher may evaluate the data. The teacher may remember the location of some students or data which the teacher may be concerned about, and the teacher can make judgments and diagnose as the teacher scans across the teaching aid 100. The teacher may determine how many students incorrectly answered the question and the teacher can reteach the subject matter until all of the students correctly answer the question.

Figure 4:
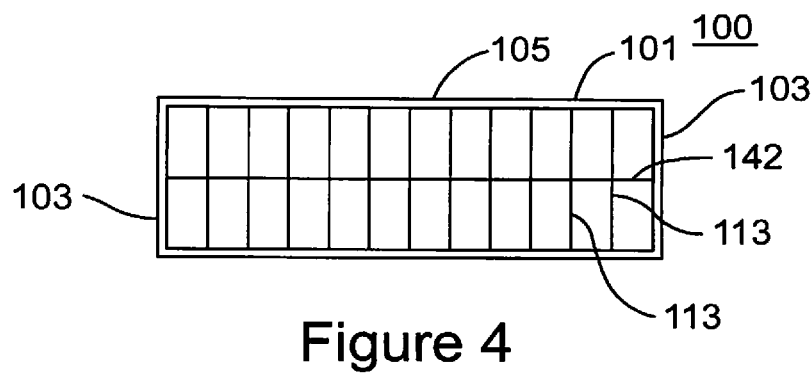
FIG. 4 illustrates a top view of the teaching aid of the present invention.

FIG. 4 illustrates a teaching aid 100 of the present invention which may include a frame member 101 which may be rectangular, circular, oval or other appropriate shape. The frame member 101 may include a pair of opposing side frame walls 103 which may be connected to a top frame wall 105 and a bottom frame wall 107, the top frame wall 105 may be connected to the pair of opposing side frame walls 103, and the bottom frame wall 107 may be connected to the pair of opposing side frame walls 103. The walls 103, 105, 107 may be substantially rectangular and may be solid and may be formed from metal, wood or other appropriate material.

In addition, the frame member 101 may include a multitude of divider walls 113 which may extend between the top frame wall 105 and the bottom frame wall 107 and may be substantially parallel to the side frame walls 103. The divider walls 113 may be equally spaced and may be a predetermined distance from adjacent divider walls 113.

In addition to the divider walls 113 which are shown as vertical divider walls 113, the present invention may include multiple horizontal divider walls 142 in order to provide additional cavities 119. The teaching aid 100 may include a handle 141.

Figure 5:
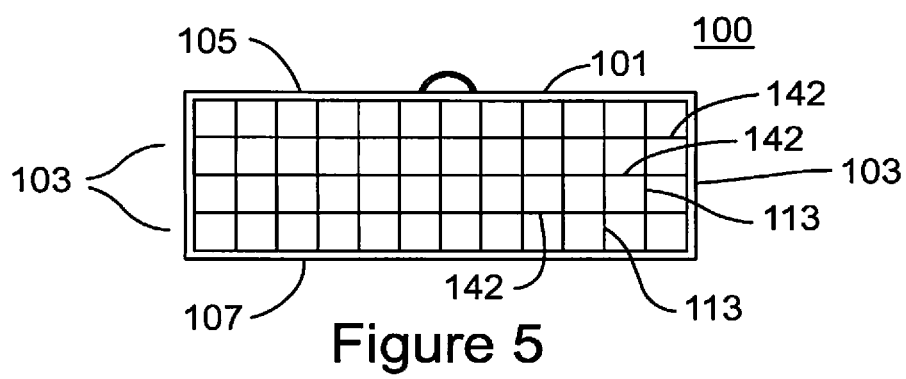
FIG. 5 illustrates a top view of the teaching aid of the present invention.

FIG. 5 illustrates a teaching aid 100 of the present invention which may include a frame member 101 which may be rectangular, circular, oval or other appropriate shape. The frame member 101 may include a pair of opposing side frame walls 103 which may be connected to a top frame wall 105 and a bottom frame wall 107, the top frame wall 105 may be connected to the pair of opposing side frame walls 103, and the bottom frame wall 107 may be connected to the pair of opposing side frame walls 103. The walls 103, 105, 107 may be substantially rectangular and may be solid and may be formed from metal, wood or other appropriate material.

In addition, the frame member 101 may include a multitude of divider walls 113 which may extend between the top frame wall 105 and the bottom frame wall 107 and may be substantially parallel to the side frame walls 103. The divider walls 113 may be equally spaced and may be a predetermined distance from adjacent divider walls 113. In addition to the divider walls 113 which are shown as vertical divider walls 113, the present invention may include multiple horizontal divider walls 142 in order to provide additional cavities 119. The teaching aid 100 a include a handle 141.

Figure 6:
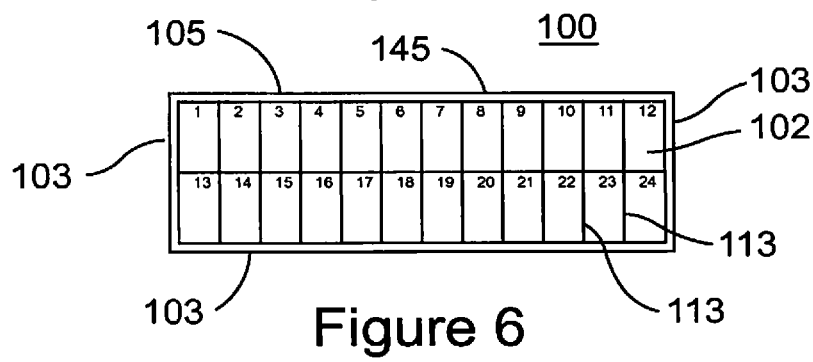
FIG. 6 illustrates a top view of the teaching aid of the present invention.

FIG. 6 illustrates a teaching aid 100 of the present invention which may include a frame member 101 which may be rectangular, circular, oval or other appropriate shape. The frame member 101 may include a pair of opposing side frame walls 103 which may be connected to a top frame wall 105 and a bottom frame wall 107, the top frame wall 105 may be connected to the pair of opposing side frame walls 103, and the bottom frame wall 107 may be connected to the pair of opposing side frame walls 103. The walls 103, 105, 107 may be substantially rectangular and may be solid and may be formed from metal, wood or other appropriate material.

In addition, the frame member 101 may include a multitude of divider walls 113 which may extend between the top frame wall 105 and the bottom frame wall 107 and may be substantially parallel to the side frame walls 103. The divider walls 113 may be equally spaced and may be a predetermined distance from adjacent divider walls 113.

FIG. 6 additionally illustrates indicia 145 which may be positioned on the back wall 102.

In addition to the divider walls 113 which are shown as vertical divider walls 113, the present invention may include an horizontal divider wall 142 in order to provide additional cavities 119. The teaching aid 100 may include a handle 141.

Figure 7:
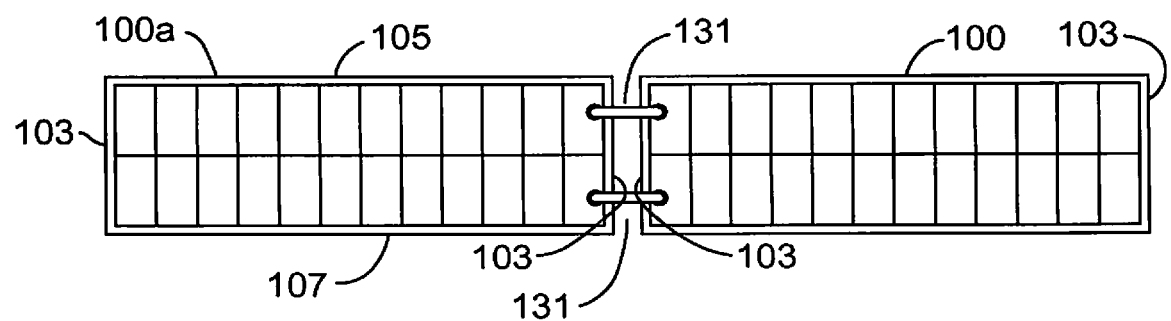
FIG. 7 illustrates a top view of a first teaching aid and a second teaching aid of the present invention.

FIG. 7 illustrates a first teaching aid 100 and a second teaching aid 100a of the present invention each of which may include a frame member 101 which may be rectangular, circular, oval or other appropriate shape. The frame member 101 may include a pair of opposing side frame walls 103 which may be connected to a top frame wall 105 and a bottom frame wall 107, the top frame wall 105 may be connected to the pair of opposing side frame walls 103, and the bottom frame wall 107 may be connected to the pair of opposing side frame walls 103. The walls 103, 105, 107 may be substantially rectangular and may be solid and may be formed from metal, wood or other appropriate material.

In addition, the frame member 101 may include a multitude of divider walls 113 which may extend between the top frame wall 105 and the bottom frame wall 107 and may be substantially parallel to the side frame walls 103. The divider walls 113 may be equally spaced and may be a predetermined distance from adjacent divider walls 113.

The first teaching aid 100 and the second teaching aid 100a may be connected by a opposing pair of hinges 131 which may be connected to the opposing side frame walls 103. The hinges may allow the first teaching aid 100 to be folded over or under the second teaching aid 100a.

Figure 8:
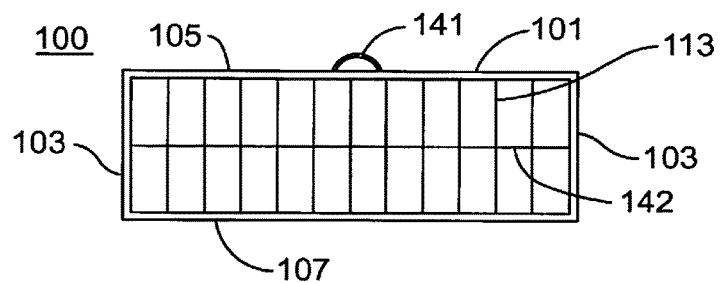
FIG. 8 illustrates the teaching device of the present invention.

FIG. 8 illustrates a teaching aid 100 of the present invention which may include a frame member 101 which may be rectangular, circular, oval or other appropriate shape. The frame member 101 may include a pair of opposing side frame walls 103 which may be connected to a top frame wall 105 and a bottom frame wall 107, the top frame wall 105 may be connected to the pair of opposing side frame walls 103, and the bottom frame wall 107 may be connected to the pair of opposing side frame walls 103. The walls 103, 105, 107 may be substantially rectangular and may be solid and may be formed from metal, wood or other appropriate material.

In addition, the frame member 101 may include a multitude of divider walls 113 which may extend between the top frame wall 105 and the bottom frame wall 107 and may be substantially parallel to the side frame walls 103. The divider walls 113 may be equally distance from adjacent divider walls 113 and may be a predetermined distance from adjacent divider walls 113. In addition to the divider walls 113 which are shown as vertical divider walls 113, the present invention may include an horizontal divider wall 142 in order to provide additional cavities 119. The teaching aid 100 a include a handle 141.

Figures 9, 10:
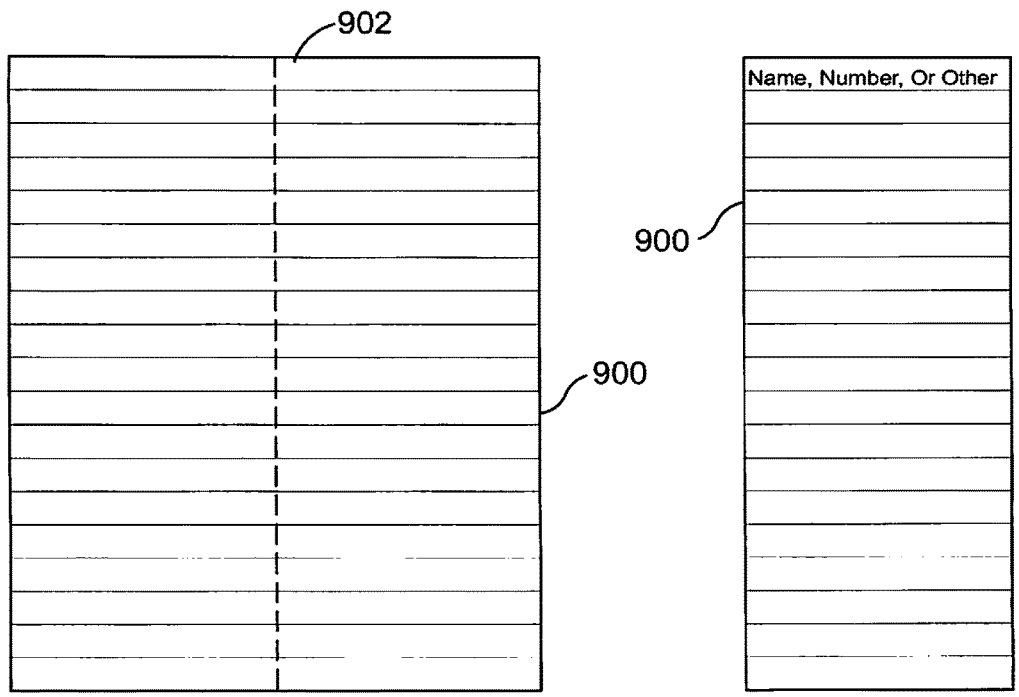
FIG. 9 illustrates an answer sheet of the present invention.
FIG. 10 illustrates a folded answer sheet of the present invention.

FIG. 9 illustrates an answer sheet 900 of the present invention and illustrates a substantially vertical fold line 902 down the substantially center of the answer sheet 900.

FIG. 10 illustrates the answer sheet 900 of the present invention which may be folded along the fold line 902 and illustrates that the name, number or other identifier such as a student number has been placed on the substantially top horizontal line.

The questions may be placed on one side of the answer sheet 900, and the answers can be placed on the opposing side of the answer sheet 900.

Figures 11, 12:
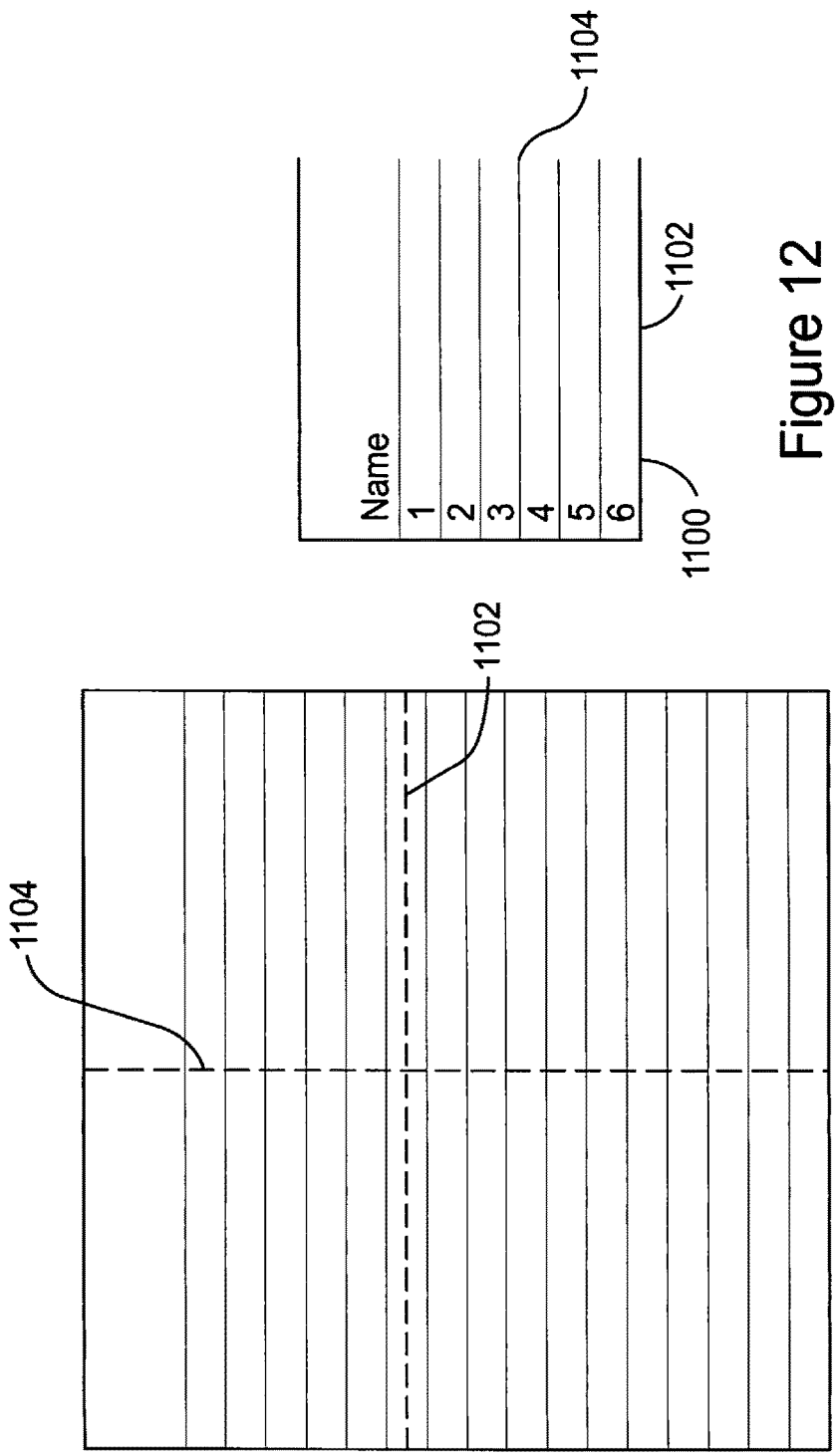
FIG. 11 illustrates an answer sheet of the present invention.
FIG. 12 illustrates a folded answer sheet of the present invention.

FIG. 11 illustrates an answer sheet 1100 of the present invention which may include a horizontal fold line 1102 which may extend across the substantially center of the answer sheet 1100 and may include a vertical fold line 1104 which may extend across the substantially center of the answer sheet 1100.

FIG. 12 illustrates the answer sheet 1100 which has been folded along the horizontal fold line 1102 and which has been folded along the vertical fold line 1104 to provide a substantially smaller answer sheet 1100.

Figure 13:
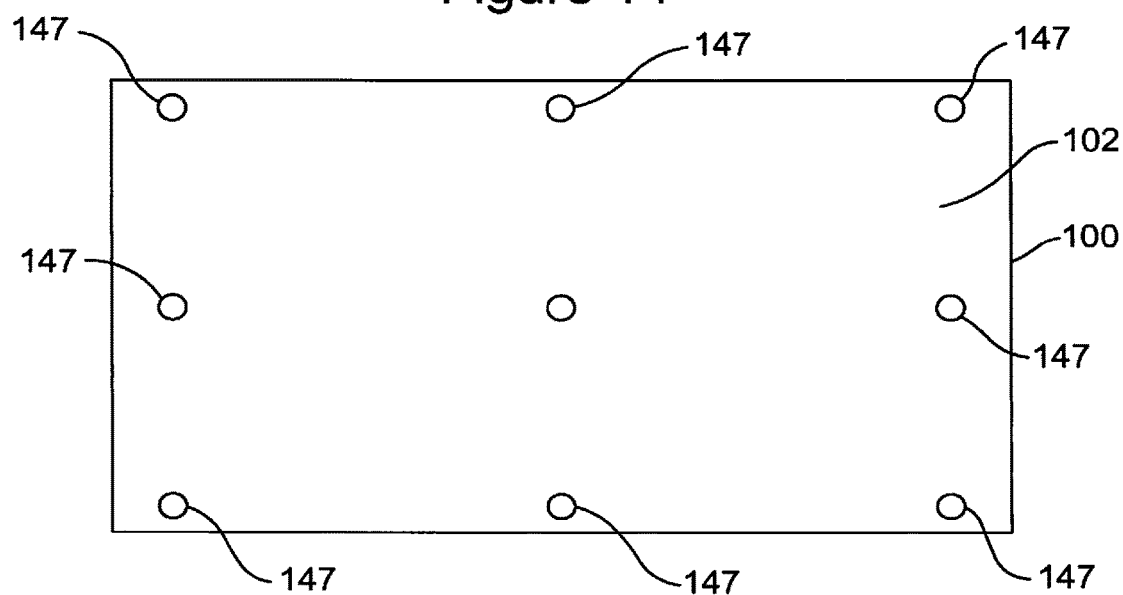
FIG. 13 illustrates a bottom view of the teaching aid of the present invention.

FIG. 13 illustrates a bottom view of the teaching aid 100 of the present invention and illustrates that downward projections 147 (fingers or feet) may be connected to the bottom wall 102 to elevate the teaching aid 100 from the support surface such as a floor or desk.

Figure 14:
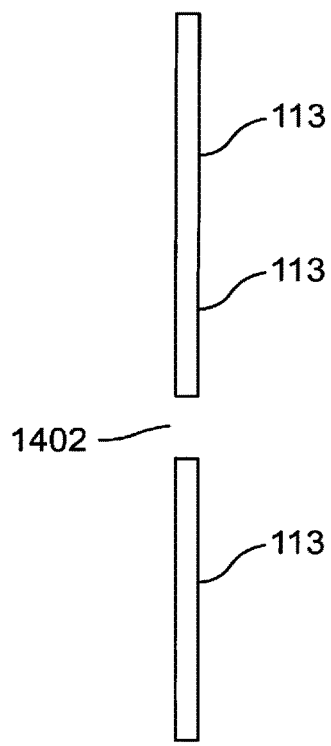
FIG. 14 illustrates a side view of the vertical dividers of the present invention.

FIG. 14 illustrates that the divider walls 113 may be discontinuous to provide a space or gap 1402 to allow the eye guide 111 to be positioned within the gap 1402 to hold the answer sheets positioned within the cavity 119.

Figure 15:
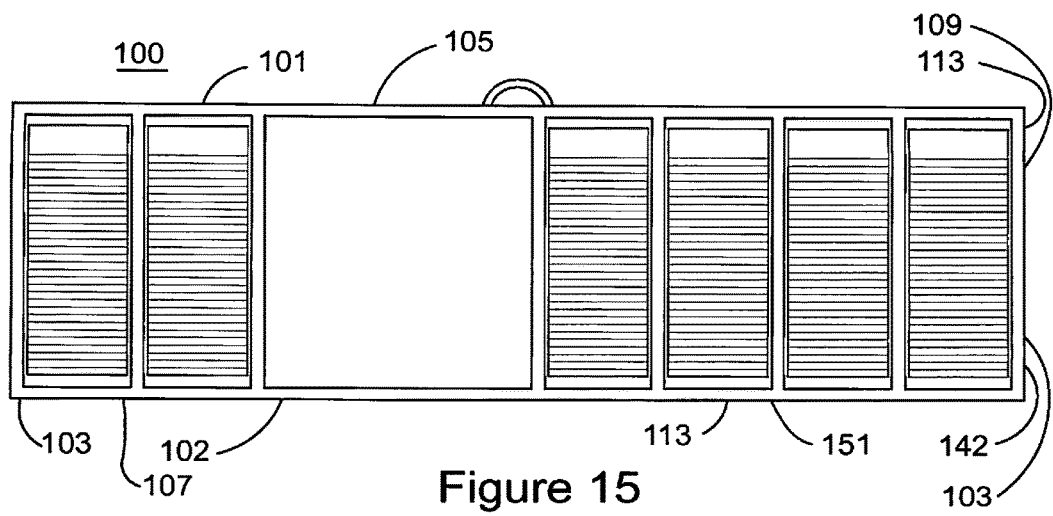
FIG. 15 illustrates the teaching aid of the present invention.

FIG. 15 illustrates a teaching aid 100 of the present invention which may include a frame member 101 which may be rectangular, circular, oval or other appropriate shape. The frame member 101 may include a pair of opposing side frame walls 103 which may be connected to a top frame wall 105 and a bottom frame wall 107, the top frame wall 105 may be connected to the pair of opposing side frame walls 103, and the bottom frame wall 107 may be connected to the pair of opposing side frame walls 103. The walls 103, 105, 107 may be substantially rectangular and may be solid and may be formed from metal, wood or other appropriate material.

In addition, the frame member 101 may include a multitude of divider walls 113 which may extend between the top frame wall 105 and the bottom frame wall 107 and may be substantially parallel to the side frame walls 103. The divider walls 113 may be equally spaced and may be a predetermined distance from adjacent divider walls 113.

The top frame wall 105, the bottom frame wall 107 and the side frame wall 103 may cooperate with the divider walls 113 to form a multitude of cavities 119 which may accept individual student material 151. The cavities 119 may include indicia 145 to indicate the student and may be substantially the same size. The teaching aid 100 may include or may not include a back wall 102 which may connect the side frame wall 103, the top frame wall 105 and the bottom frame wall 107. The back wall 102 may support the answers submitted by the students.

In addition, a side rail 109 may be positioned over each of the side frame walls 103 and may extend from the top frame wall 105 to the bottom frame wall 107. The side rail 109 may be formed from magnetic material in order to cooperate with a separate magnet 123 or a magnetic portion of an eye guide 111 which may extend substantially perpendicular to the divider walls 113 and the slidable eye guide 111 may move along the side rail 109. A magnet 123 may be positioned over the eye guide 111 and cooperate with the side rail 109 to retain the eye guide 111 in a position to help the teacher evaluate the answers of the student which may be placed in the cavity 119. Thus, the teacher may grade the same question/homework of the students before the eye guide 111 is moved to evaluate the next answer.

In addition to the divider walls 113 which are shown as vertical divider walls 113, the present invention may include an horizontal divider wall 142 in order to provide additional cavities 119. The teaching aid 100 may include a handle 141.

Figure 16:
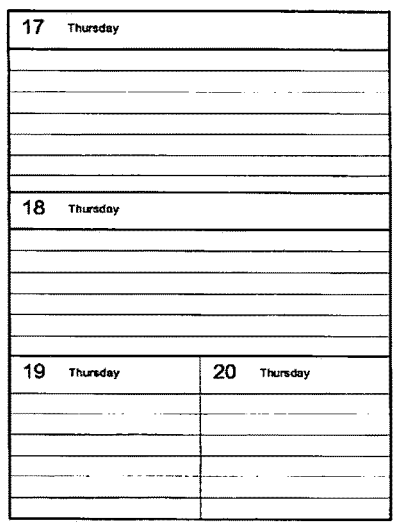
FIG. 16 illustrates an answer sheet of the present invention.

FIG. 16 illustrates an answer sheet or datasheet which may be developed for company and the cavity could be developed to match the datasheet.

Figure 17:
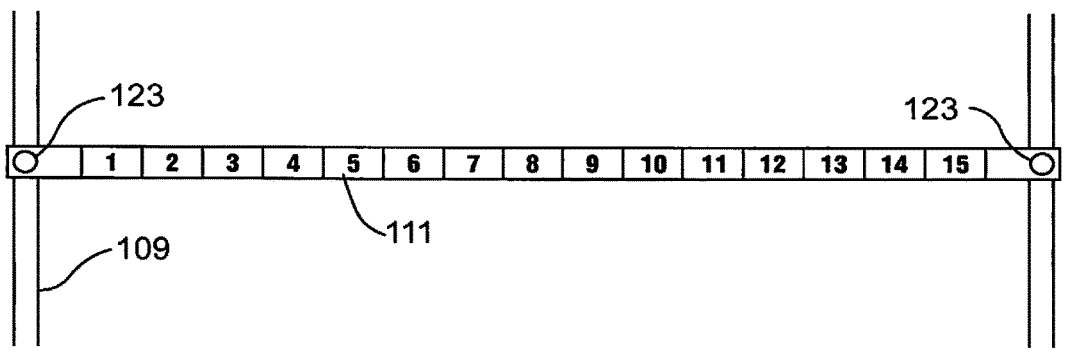
FIG. 17-21 illustrates the teaching aid of the present invention.
Figure 18:
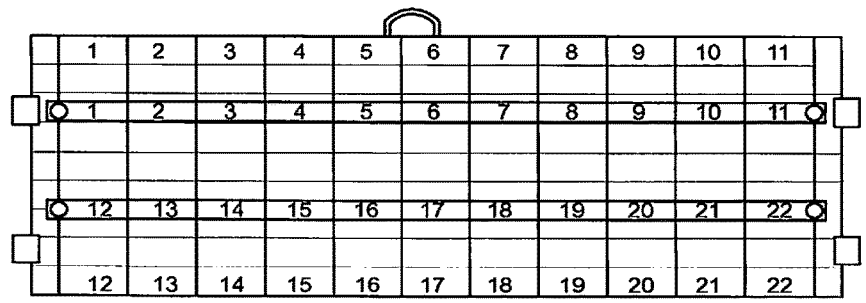
Figure 19:
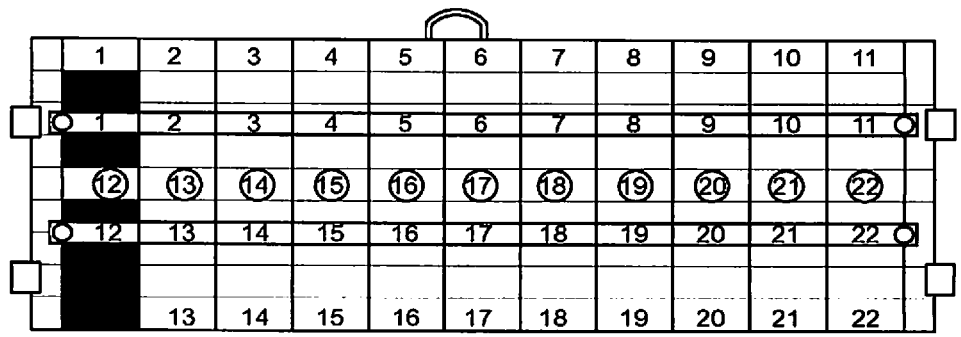
Figure 20:
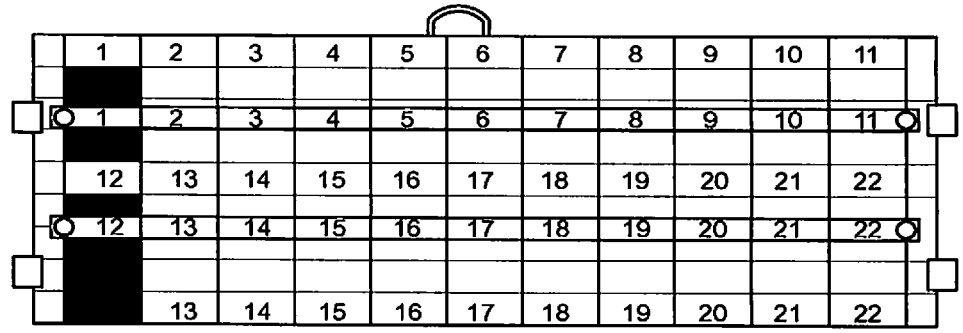
Figure 21:
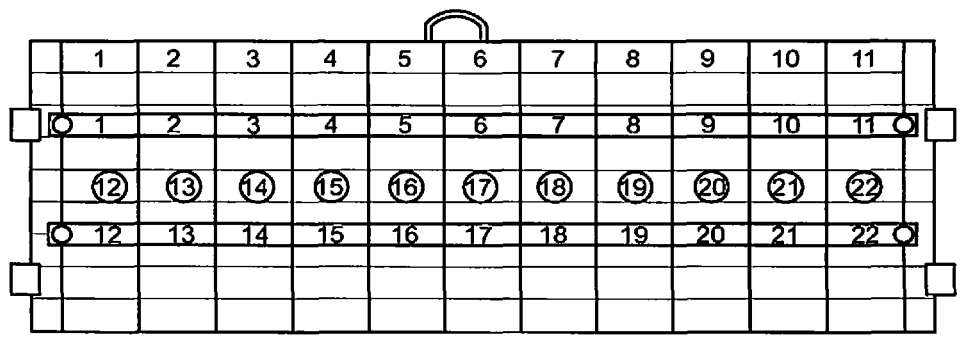

FIG. 17 illustrates the side rail 109 and the eye guide 111 which may be slidable/movable on the side rail 109. FIG. 17 additionally illustrates the magnet 123.

FIG. 18-FIG. 21 illustrate different cavity 119 sizes.

Figure 22:
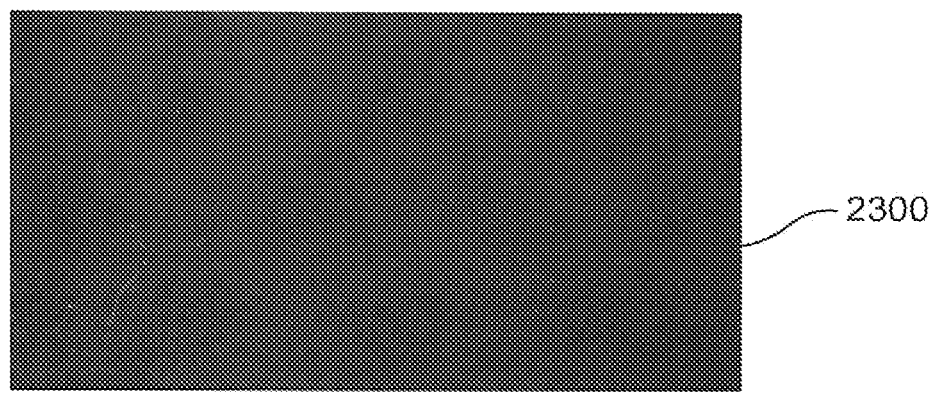
FIG. 22 illustrates a colored answer sheet of the present invention.

FIG. 22 illustrates an index card 2300 being used as an answer or datasheet where the index card 2300 may be fully colored.

Figure 23:
FIG. 23 illustrates a partially colored answer sheet of the present invention.

FIG. 23 illustrates an index card 2400 being used as an answer or datasheet where the index card 2400 may be partially colored.

Figure 24:
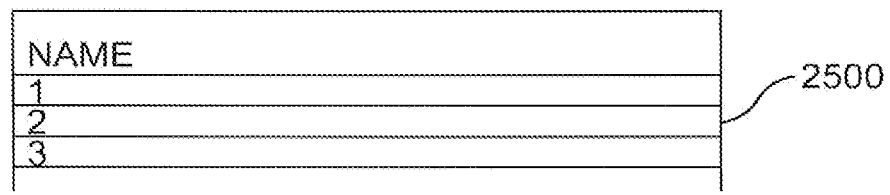
FIG. 24 illustrates an uncolored answer sheet of the present invention.

FIG. 24 illustrates an index card 2500 being used as an answer or datasheet where the index card may be not colored.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A teaching aid to aid in evaluating data, comprising:
   a frame member;
   an eye guide movably connected to the frame member to guide a user of the teaching aid in evaluating the data, wherein the eye guide extends across the entire length of the teaching aid and wherein the eye guide is magnetically connected to the frame member; and
   wherein the frame member includes a top frame wall, a pair of opposing side frame walls to connect to the top frame wall and a bottom frame wall to connect to the pair of opposing side frame walls and wherein the frame member includes a plurality of divider walls to define recessed and exposed cavities for the data to be evaluated.

2. A teaching aid to aid in evaluating data as in claim 1, wherein each of the plurality of divider walls constitutes a vertical divider wall.

3. A teaching aid to aid in evaluating data as in claim 1, wherein each of the plurality of divider walls constitutes a horizontal divider wall.

4. A teaching aid to aid in evaluating data as in claim 1, wherein the teaching aid includes a handle.

5. A teaching aid to aid in evaluating data as in claim 1, wherein the teaching aid includes indicia to indicate the data.

6. A teaching aid to aid in evaluating data as in claim 1, wherein the data is an answer to a test.

7. A teaching aid to aid in evaluating data as in claim 1, wherein the teaching aid includes a downward projection to cooperate with a support surface.

* * * * *